Figure 1:
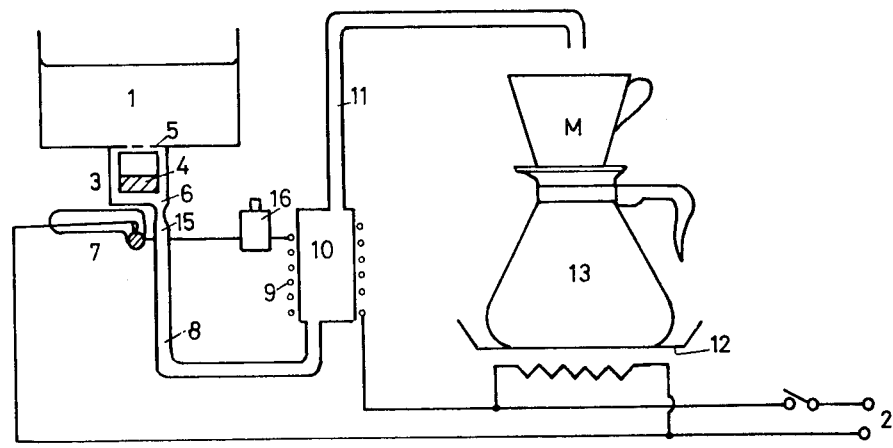

United States Patent [19]

Thorsoe et al.

[11] 4,039,771
[45] Aug. 2, 1977

[54] COFFEE MAKER

[75] Inventors: Flemming Thorsoe, Sonderborg; Niels Lervad Andersen; John Christensen, both of Nordborg, all of Denmark

[73] Assignee: Danfoss A/S, Nordborg, Denmark

[21] Appl. No.: 749,212

[22] Filed: Dec. 10, 1976

Related U.S. Application Data

[60] Division of Ser. No. 691,972, June 2, 1974, which is a continuation of Ser. No. 409,697, Oct. 25, 1973, abandoned.

[30] Foreign Application Priority Data

Nov. 8, 1972  Denmark .............................. 5516/72

[51] Int. Cl.$^2$ ........................... F24H 1/00; H05B 1/00
[52] U.S. Cl. ...................................... 219/328; 99/281; 219/301; 219/505
[58] Field of Search ............... 219/296, 301, 302, 504, 219/505, 328, 335-336, 338; 99/280-282

[56] References Cited

U.S. PATENT DOCUMENTS

| 2,519,920 | 8/1950 | Miner | 219/301 |
|---|---|---|---|
| 3,400,250 | 9/1968 | Buiting et al. | 219/505 X |
| 3,646,313 | 2/1972 | Gorgone et al. | 219/505 X |
| 3,691,934 | 9/1972 | Horn et al. | 99/290 |

*Primary Examiner*—C. L. Albritton

[57] ABSTRACT

The invention relates to a coffee maker assembly which has a heat exchanger having inlet and outlet pipes. Heat for the heat exchanger is supplied by an electrical heating element. In one embodiment a PTC resistor is in series with the heating element and thermal connections are provided between the resistor and other parts of the system. This allows thermal conditions to be sensed which alter the resistance of the PTC resistor to effect a temperature control by varying the magnitude of current supplied to the heating element. Another embodiment illustrates the heating element itself being formed by an annularly shaped PTC resistor.

1 Claim, 7 Drawing Figures

COFFEE MAKER

This is a divisional application of Ser. No. 691,972 filed June 2, 1976 which is a continuation of Ser. No. 409,697, filed Oct. 25, 1973, now abandoned.

The invention relates to a coffee maker of the type consisting of a water tank at the top, a discharge device at the bottom, connected via a pipe to an electrically heated heat exchanger which has a riser pipe with an outlet nozzle connected to its opposite end, plus a warming plate for a coffeepot to be placed under the outlet nozzle.

In such coffee makers it is important that precautions are taken against dry-boiling and overheating of the electric heat exchanger, for instance because of incrustation. We already know coffee makers which have, in a chamber connected to the outlet of the water tank, a float with a magnet. When the tank is empty the float will sink to the bottom of the chamber, and the magent will then actuate a relay, for instance a mercury relay. When the relay is actuated, the circuit of the electric heat exchanger will be cut out. For further protection of the heating element there may, connected in series to the said circuit, be a fuse or a thermostatic switch, for instance the type marketed under the name of "KLIXON".

It is the object of the invention to specify a coffee maker in which the temperature and the presence of water are controlled in a simple way, and in which both the float and the thermostatic switch can be spared without affecting the safety.

According to the invention this is obtained by connecting in series to the heating element of the heat exchanger a PTC resistor which is thermally connected to at least the cold-water inlet pipe.

What is obtained thereby is that the cooling effect of the PTC resistor stops when the flow of water stops after the coffee has been made, and then the PTC resistor will reach its curie temperature, will become high-resistant, and therefore the current passing through the heating element will be reduced to a negligible value. The effect of this is intensified if the PTC resistor is thermally connected also to the heat exchanger. What is further obtained thereby is that the heating effect will be cut out in case of incrustation in the heat exchanger, so that the heat generated in the heating element cannot be transmitted to the water.

So, the PTC resistor is actuated by three factors:
1. Self-heating because of the current passing through it,
2. cooling through the cold water, and
3. heating through the heat exchanger.

In practice, such a construction can be made by attaching the PTC resistor, electrically insulated but thermally connected, to a metal bridge on which the water-inlet pipe and the heat exchanger are soldered, in such a way that the thermal resistance from the inlet pipe to the PTC resistor is reduced to a minimum. Then the thermal resistance from the heat exchanger to the PTC resistor, and the effect arrested in the PTC resistor, can be adapted to the requirements in question, so that the necessary thermal balance will be obtained.

In a preferred embodiment the heat exchanger is a cylindrical metal container, around which is attached an electric heating element, insulated from the container. If an annular PTC resistor is used, it can simply be attached to an insulating component around a water inlet and form the bottom or the top of the heat exchanger.

In a different embodiment the heat exchanger can be a PTC resistor. Then the water must be insulated effectively from the PTC unit.

However, the coffee maker specified above has the drawback that the PTC resistor must be cooled after a certain quantity of coffee has been made, because automatic cutting-in of the heating element is impossible when a PTC resistor is used as a thermal protection. In its hot, high-resistance state the PTC resistor admits a small current which is sufficient to keep the PTC resistor at the curie point.

This drawback is overcome if a microswitch is connected to the warming plate of the coffee maker, cutting out the circuit of the PTC resistor when the coffeepot is removed for pouring of coffee.

After less than a minute the PTC resistor has been cooled and will switch over to its low-resistance state, and immediately after having poured the coffee the housewife can refill the coffee maker with water, put the coffeepot on the warming plate, and the coffee maker will automatically start working again.

In a preferred embodiment a preferably circular, discoid PTC resistor is attached under the warming plate of the coffee maker. The PTC resistor is electrically connected in series to the thermal winding of the heat exchanger and thermally connected to the cold-water inlet. During the coffee-making process PTC resistor is then cooled by the cold-water flow, and the heat exchanger will heat the water flowing through. After the coffee has been made the cooling stops, and therefore the temperature of the PTC resistor rises above the curie point, thereby being able partly to keep the coffee made at the required temperature, partly to keep the heat exchanger cut out.

The invention is specified below with reference to the drawings, showing in

Figure 2:
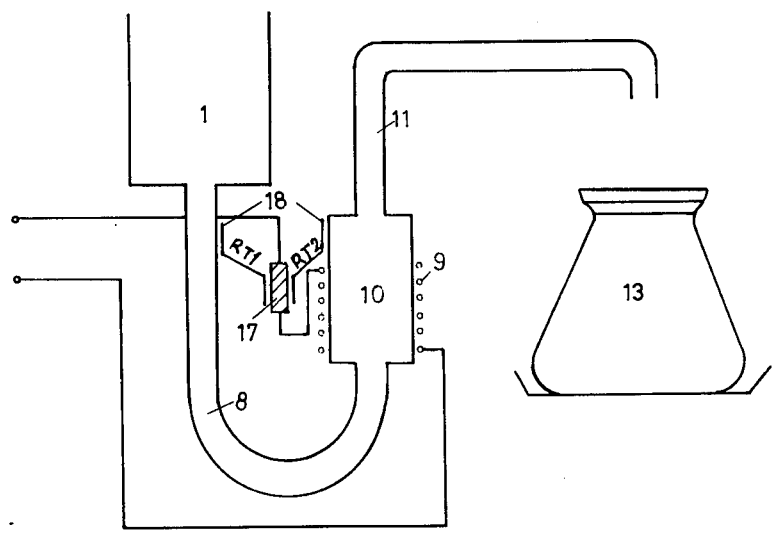
Figure 3:
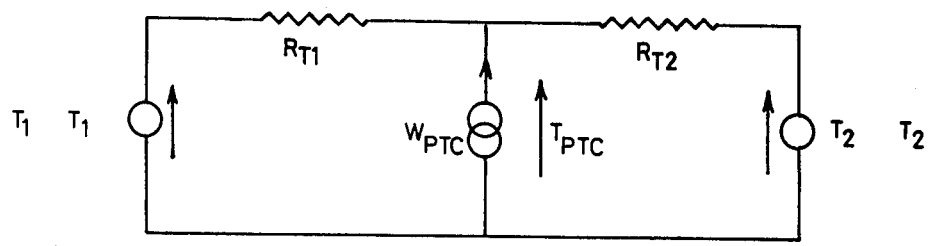
Figure 4:
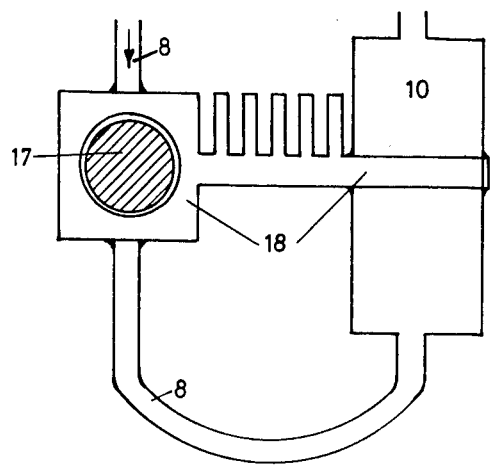
Figure 5:
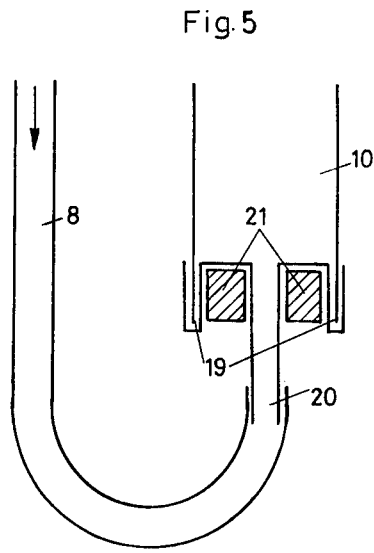
Figure 6:
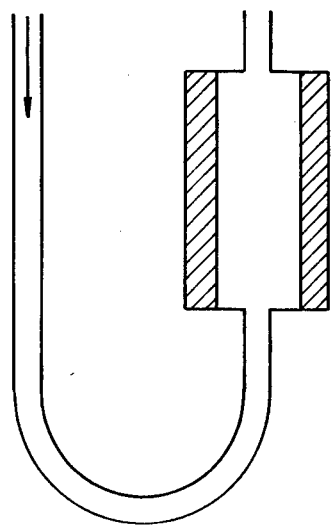
Figure 7:
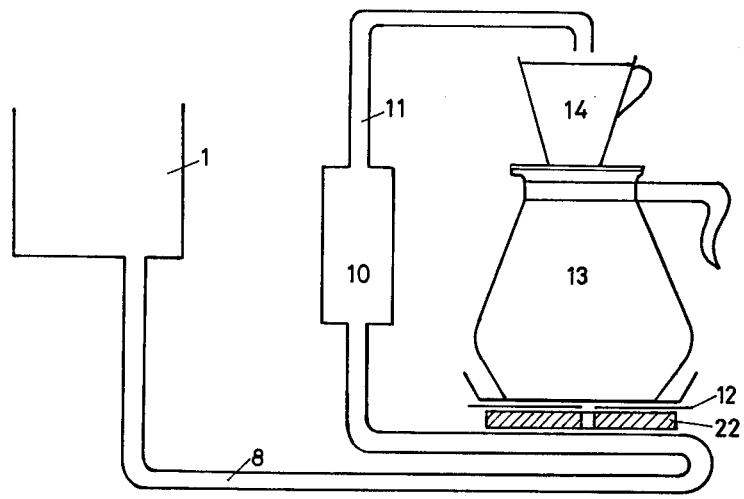

FIG. 1 diagram of a coffee maker known already,

FIG. 2 diagram of the embodiment according to the invention,

FIG. 3 equivalence diagram of the thermal conditions,

FIG. 4 diagram of the embodiment of the thermal connection of the PTC resistor,

FIG. 5 a different embodiment of the thermal connection of the PTC resistor,

FIG. 6 embodiment of a heat exchanger built up of annular PTC components,

FIG. 7 a different embodiment of a coffee maker.

A diagram of a coffee maker of the type known already is shown in FIG. 1. Cold water is poured into the water tank 1, and then the terminals 2 are connected to the mains. At the bottom of the water tank there is a float 3 with a magnet 4 which rises from the bottom when there is water in the tank 1. A net 5 prevents the float from rising to the surface. When the float has risen from the outlet 6 of the water tank, a magnetically actuated switch 7 is released, no longer being actuated by the magnet 4. Then the heating element 9 of the heat exchanger 10 will be connected to the mains and will heat the water in the outlet pipe 8, the heat exchanger 10 and the riser pipe 11. During filling of the water tank 1 the level of the water in the riser pipe will be equal to the level of the water in the water tank. When the water in the heat exchanger 10 is approaching the boiling point, the water in the riser pipe 11 will rise and run through the riser pipe into the coffeepot 13 with the coffee filter 14, placed on the warming plate 12. A contraction 15 of the pipe 8 between the water tank 1 and the heat exchanger 10 prevents the boiling water from running backwards. Here a non-return valve can also be used. The warming plate 12 is connected directly to the mains terminals. It is not thermostatically controlled but is adjusted so that the coffee made will keep a temperature of 70°-80° centigrade. This temperature will depend, to a certain degree, on the quantity of coffee, the mains voltage and the surrounding temperature.

When the water tank 1 is empty, the float with the magnet 4 will sink to the bottom of the chamber and actuate the mercury relay 7, and thereby the current to the heat exchanger 10 will be cut off. Because there is a risk of choking (for instance because of incrustation) the heat exchanger 10 is further secured by means of an adjustable thermostat 15 (for instance of the type marketed under the name of "KLIXON").

FIG. 2 shows a diagram of an embodiment according to the invention. The components shown have, if they are alike, the same reference marks as the components shown in FIG. 1. The water tank 1 is connected directly via a connecting pipe 8 to the heat exchanger 10, and the outlet of the latter leads, as mentioned before, via the riser pipe 11 to a discharge nozzle over the coffeepot 13. Here the heating element 9 of the heat exchanger 10 is connected to the power source in series with a PTC resistor 17 which is, via a thermally conductive attachment device 18, thermally connected to both the cold-water inlet pipe 8 and to the heat exchanger 10. So, the PTC resistor 17 is actuated by both its own heating because of the current of the heating element, by the temperature of the cold water supplied, and by the surface temperature of the heat exchanger. Physically, the component is attached so that there are well-defined thermal resistances $R_{T1}$ and $R_{T2}$ to the cold-water inlet pipe and the heat exchanger respectively, The electric cold resistor $R_{EK}$ of the component (much smaller than the resistor of the heating element 9) should be of a value preventing the effect arrested in the component, because of the heat transmission through the thermal impedances, from raising the temperature of the component above the curie temperature as long as water is flowing through the system. When water is no longer flowing (after the coffee has been made), the cooling effect of $R_{T1}$ will stop, and the heating effect through $R_{T2}$ will be increased. Then the PTC component will reach its curie temperature, will become high-resistant (much more than the resistor of the heating element 9), and consequently the current through the heating element will be reduced to a negligible value.

When looking apart from other thermal influences the process can be specified through the equivalence diagram shown in FIG. 3. From this diagram the following dimensioning expression is found:

$$T_{PTC} = \frac{T_1 \times R_{T2} + T_2 \times R_{T1} + W_{PTC} \times R_{T1} \times R_{T2}}{R_{T1} + R_{T2}} < T_{curie}$$

and after the water has been used the state above the curie point is governed by the following:

$$T_{PTC} = \frac{T_1 \times R_{T2} + T_2 \times R_{T1} + W_{PTC} \times R_{T1} \times R_{T2}}{R_{T1} + R_{T2}} > T_{curie}$$

It goes without saying that the above two conditions will be met in innumerable sets of parameters ($R_{T1}$, $R_{T2}$, $W_{PTC}$, $T_{curie}$), and consequently practical embodiments may vary in construction.

FIG. 4 shows an embodiment in which the PTC resistor 17 is attached, electrically insulated, to a metal bridge 18 on which the inlet pipe 8 and the heat exchanger 10 are soldered, minimizing the thermal resistance $R_{T1}$ from inlet pipe to PTC resistor, whereas the thermal resistance $R_{T2}$ from heat exchanger to PTC resistor and the electric effect arrested in the PTC resistor are adjusted to the above requirements.

FIG. 5 shows a different embodiment in which the bottom of the heat exchanger is a formed, insulating component 19 with a connection 20 for the cold water. In the insulating component an annular PTC component 21 can be attached in such a way that the thermal impedance requirements are met.

One more embodiment of the heat exchanger is shown in FIG. 6. Here the heating element of the heat exchanger is a PTC resistor. In such case the heat exchanger can be built up with one cylindrical PTC component, or it can be composed of several annular PTC components. However, both water and pipe connections must then be electrically insulated from the PTC resistor, so that the water will not become live.

FIG. 7 shows another embodiment of the coffee maker in which the heating element of the warming plate 12 of the coffee maker is a preferably circular, discoid PTC component 22, during the coffee-making process kept cool by the cold water flowing through it, and after the coffee has been made rising to a temperature above the curie temperature, thereby being able partly to keep the coffee made at the required temperature, partly to keep the power to the heat exchanger cut off.

What we claim is:

1. A coffee maker assembly comprising a heat exchanger having a cold water inlet pipe and a hot water outlet pipe, electrical heating means for and in close proximity to said heat exchanger, a power supply circuit connected to said electrical heating means, a PTC resistor in said circuit and being thermally connected to said cold water inlet pipe and to the downstream end of said heat exchanger, one end of said heat exchanger and one of said pipes forming an outwardly open annularly shaped well, said resistor being annularly shaped and disposed in said well.

* * * * *